US008788372B2

(12) United States Patent
Kettner et al.

(10) Patent No.: US 8,788,372 B2
(45) Date of Patent: Jul. 22, 2014

(54) METHOD AND SYSTEM FOR CLASSIFYING RETAIL PRODUCTS AND SERVICES USING CHARACTERISTIC-BASED GROUPING STRUCTURES

(75) Inventors: Björn Kettner, Saarbrücken (DE); Cornelia Behrendt-Schinke, Saarbrücken (DE); Jörg Haupenthal, St. Wendel (DE)

(73) Assignee: SAP Aktiengesellschaft (DE)

( * ) Notice: Subject to any disclaimer, the term of this patent is extended or adjusted under 35 U.S.C. 154(b) by 1248 days.

(21) Appl. No.: 10/935,470

(22) Filed: Sep. 7, 2004

(65) Prior Publication Data

US 2005/0197883 A1    Sep. 8, 2005

Related U.S. Application Data

(60) Provisional application No. 60/551,221, filed on Mar. 8, 2004, provisional application No. 60/563,284, filed on Apr. 16, 2004.

(51) Int. Cl.
*G06Q 10/00* (2012.01)
*G06Q 10/08* (2012.01)
*G06Q 20/20* (2012.01)

(52) U.S. Cl.
CPC .............. *G06Q 10/087* (2013.01); *G06Q 10/08* (2013.01); *G06Q 20/203* (2013.01)
USPC .......................................................... 705/28

(58) Field of Classification Search
CPC .... G06Q 10/08; G06Q 10/087; G06Q 20/203
USPC ...................................................... 705/1, 28
See application file for complete search history.

(56) References Cited

U.S. PATENT DOCUMENTS

| 4,752,877 A | 6/1988 | Roberts et al. |
| 5,315,508 A | 5/1994 | Bain et al. |

(Continued)

FOREIGN PATENT DOCUMENTS

| JP | 2004-30343 A | 1/2004 |
| WO | WO 99/45450 A2 | 9/1999 |
| WO | WO 01/71635 A2 | 9/2001 |

OTHER PUBLICATIONS

Bedner, Walter. "When product designers use perceptually based color tools". Journal of electronic Imaging 10(1), 188-193 (Jan. 2001).*

(Continued)

*Primary Examiner* — Candice D Wilson
(74) *Attorney, Agent, or Firm* — Foley & Lardner LLP

(57) ABSTRACT

A method of and system for classifying retail products and services is disclosed. The method includes determining a grouping of characteristic values in a computerized system, wherein the grouping of characteristic values includes a subset of a plurality of predetermined values for a characteristic. The method also includes associating the grouping of characteristic values with a grouping of at least one of retail products and services. The system includes means for determining a grouping of characteristic values, wherein the grouping of characteristic values includes a subset of a plurality of predetermined values for a characteristic. The system also includes means for associating the grouping of characteristic values with a grouping of at least one of retail products and services.

27 Claims, 9 Drawing Sheets

(56) References Cited

U.S. PATENT DOCUMENTS

| | | | |
|---|---|---|---|
| 5,400,253 A | 3/1995 | O'Connor | |
| 5,615,109 A | 3/1997 | Eder | |
| 5,675,637 A | 10/1997 | Szlam et al. | |
| 5,758,327 A | 5/1998 | Gardner et al. | |
| 5,774,866 A | 6/1998 | Horwitz et al. | |
| 5,870,716 A | 2/1999 | Sugiyama et al. | |
| 5,930,769 A * | 7/1999 | Rose | 705/27 |
| 5,930,771 A | 7/1999 | Stapp | |
| 5,974,418 A | 10/1999 | Blinn et al. | |
| 5,999,914 A | 12/1999 | Blinn et al. | |
| 6,029,139 A | 2/2000 | Cunningham et al. | |
| 6,064,984 A | 5/2000 | Ferguson et al. | |
| 6,185,550 B1 | 2/2001 | Snow et al. | |
| 6,260,024 B1 | 7/2001 | Shkedy | |
| 6,338,039 B1 | 1/2002 | Lonski et al. | |
| 6,341,351 B1 | 1/2002 | Muralidhran et al. | |
| 6,363,488 B1 | 3/2002 | Ginter et al. | |
| 6,366,890 B1 * | 4/2002 | Usrey | 705/10 |
| 6,418,416 B1 | 7/2002 | Rosenberg et al. | |
| 6,484,149 B1 * | 11/2002 | Jammes et al. | 705/26.62 |
| 6,505,093 B1 | 1/2003 | Thatcher et al. | |
| 6,507,851 B1 | 1/2003 | Fujiwara et al. | |
| 6,567,822 B1 | 5/2003 | Cudahy et al. | |
| 6,614,895 B1 | 9/2003 | Impey et al. | |
| 6,665,577 B2 * | 12/2003 | Onyshkevych et al. | 700/130 |
| 6,678,695 B1 | 1/2004 | Bonneau et al. | |
| 6,701,299 B2 | 3/2004 | Kraisser et al. | |
| 6,725,204 B1 | 4/2004 | Gusley | |
| 6,829,348 B1 | 12/2004 | Schroeder et al. | |
| 6,834,282 B1 * | 12/2004 | Bonneau et al. | 1/1 |
| 6,868,528 B2 | 3/2005 | Roberts | |
| 6,910,017 B1 | 6/2005 | Woo et al. | |
| 6,980,966 B1 | 12/2005 | Sobrado et al. | |
| 7,080,030 B2 | 7/2006 | Eglen et al. | |
| 7,082,408 B1 | 7/2006 | Baumann et al. | |
| 7,082,426 B2 * | 7/2006 | Musgrove et al. | 707/3 |
| 7,092,929 B1 * | 8/2006 | Dvorak et al. | 705/28 |
| 7,117,165 B1 | 10/2006 | Adams et al. | |
| 7,124,098 B2 | 10/2006 | Hopson et al. | |
| 7,124,984 B2 | 10/2006 | Yokouchi et al. | |
| 7,139,731 B1 | 11/2006 | Alvin | |
| 7,177,825 B1 | 2/2007 | Borders et al. | |
| 7,188,080 B1 * | 3/2007 | Walker et al. | 705/26 |
| 7,308,421 B2 | 12/2007 | Raghupathy et al. | |
| 7,328,177 B1 * | 2/2008 | Lin-Hendel | 705/26.7 |
| 7,330,817 B1 | 2/2008 | Exall et al. | |
| 7,346,561 B1 * | 3/2008 | Devitt et al. | 705/27 |
| 7,346,656 B2 | 3/2008 | Worthen | |
| 7,424,440 B1 * | 9/2008 | Gupta et al. | 705/10 |
| 7,809,672 B1 * | 10/2010 | Tenorio | 705/26.64 |
| 2001/0019778 A1 | 9/2001 | Gardaz et al. | |
| 2001/0032130 A1 | 10/2001 | Gabos et al. | |
| 2001/0039517 A1 | 11/2001 | Kawakatsu | |
| 2001/0049634 A1 | 12/2001 | Stewart | |
| 2002/0013731 A1 | 1/2002 | Bright et al. | |
| 2002/0023500 A1 | 2/2002 | Chikuan et al. | |
| 2002/0026368 A1 * | 2/2002 | Carter, III | 705/20 |
| 2002/0042731 A1 | 4/2002 | King, Jr. et al. | |
| 2002/0059093 A1 | 5/2002 | Barton et al. | |
| 2002/0059108 A1 | 5/2002 | Okura et al. | |
| 2002/0072986 A1 | 6/2002 | Aram | |
| 2002/0073114 A1 | 6/2002 | Nicastro et al. | |
| 2002/0078159 A1 | 6/2002 | Petrogiannis et al. | |
| 2002/0091598 A1 | 7/2002 | Farkas | |
| 2002/0107713 A1 | 8/2002 | Hawkins | |
| 2002/0116241 A1 | 8/2002 | Sandhu et al. | |
| 2002/0123930 A1 | 9/2002 | Boyd et al. | |
| 2002/0138170 A1 * | 9/2002 | Onyshkevych et al. | 700/130 |
| 2002/0138290 A1 | 9/2002 | Metcalfe et al. | |
| 2002/0140741 A1 | 10/2002 | Felkey et al. | |
| 2002/0147668 A1 | 10/2002 | Smith et al. | |
| 2002/0152128 A1 | 10/2002 | Walch et al. | |
| 2002/0156686 A1 * | 10/2002 | Kraft et al. | 705/26 |
| 2002/0184116 A1 | 12/2002 | Tam et al. | |
| 2003/0023500 A1 | 1/2003 | Boies et al. | |
| 2003/0028393 A1 | 2/2003 | Coulston et al. | |
| 2003/0028437 A1 | 2/2003 | Grant et al. | |
| 2003/0046120 A1 | 3/2003 | Hoffman et al. | |
| 2003/0046195 A1 | 3/2003 | Mao | |
| 2003/0050852 A1 | 3/2003 | Liao et al. | |
| 2003/0055718 A1 | 3/2003 | Cimini et al. | |
| 2003/0069766 A1 | 4/2003 | Hoffman et al. | |
| 2003/0074237 A1 | 4/2003 | Sechrist et al. | |
| 2003/0074269 A1 | 4/2003 | Viswanath | |
| 2003/0083914 A1 | 5/2003 | Marvin, III et al. | |
| 2003/0083961 A1 * | 5/2003 | Bezos et al. | 705/27 |
| 2003/0088449 A1 | 5/2003 | Menninger | |
| 2003/0126024 A1 | 7/2003 | Crampton et al. | |
| 2003/0144916 A1 | 7/2003 | Mumm et al. | |
| 2003/0149631 A1 | 8/2003 | Crampton et al. | |
| 2003/0149674 A1 | 8/2003 | Good et al. | |
| 2003/0158791 A1 | 8/2003 | Gilberto et al. | |
| 2003/0171998 A1 | 9/2003 | Pujar et al. | |
| 2003/0172007 A1 | 9/2003 | Helmolt et al. | |
| 2003/0200150 A1 | 10/2003 | Westcott et al. | |
| 2003/0200156 A1 | 10/2003 | Roseman et al. | |
| 2003/0208365 A1 | 11/2003 | Avery et al. | |
| 2003/0225778 A1 | 12/2003 | Fisher et al. | |
| 2003/0229502 A1 | 12/2003 | Woo | |
| 2004/0010463 A1 | 1/2004 | Hahn-Carlson et al. | |
| 2004/0025048 A1 | 2/2004 | Porcari et al. | |
| 2004/0042611 A1 | 3/2004 | Power et al. | |
| 2004/0054554 A1 | 3/2004 | Barts et al. | |
| 2004/0098358 A1 | 5/2004 | Roediger | |
| 2004/0122689 A1 | 6/2004 | Dailey et al. | |
| 2004/0162763 A1 | 8/2004 | Hoskin et al. | |
| 2004/0172321 A1 | 9/2004 | Vemula et al. | |
| 2004/0186765 A1 | 9/2004 | Kataoka | |
| 2004/0186783 A1 | 9/2004 | Knight et al. | |
| 2004/0210489 A1 | 10/2004 | Jackson et al. | |
| 2004/0220861 A1 | 11/2004 | Morciniec et al. | |
| 2004/0240639 A1 | 12/2004 | Colson et al. | |
| 2004/0243428 A1 | 12/2004 | Black et al. | |
| 2004/0267674 A1 | 12/2004 | Feng et al. | |
| 2005/0015303 A1 | 1/2005 | Dubin et al. | |
| 2005/0021551 A1 | 1/2005 | Silva et al. | |
| 2005/0047577 A1 | 3/2005 | Timmins | |
| 2005/0055283 A1 | 3/2005 | Zarovinsky | |
| 2005/0060270 A1 | 3/2005 | Ramakrishnan | |
| 2005/0060318 A1 | 3/2005 | Brickman | |
| 2005/0065872 A1 | 3/2005 | Moebs et al. | |
| 2005/0075915 A1 | 4/2005 | Clarkson | |
| 2005/0075941 A1 | 4/2005 | Jetter et al. | |
| 2005/0086122 A1 | 4/2005 | Cirulli et al. | |
| 2005/0096963 A1 | 5/2005 | Myr et al. | |
| 2005/0102175 A1 | 5/2005 | Dudat et al. | |
| 2005/0102192 A1 | 5/2005 | Gerrits et al. | |
| 2005/0102227 A1 | 5/2005 | Solonchev | |
| 2005/0137932 A1 | 6/2005 | D'Angelo et al. | |
| 2005/0165647 A1 | 7/2005 | Razumov | |
| 2005/0165659 A1 | 7/2005 | Gruber | |
| 2005/0171825 A1 | 8/2005 | Denton et al. | |
| 2005/0197952 A1 | 9/2005 | Shea et al. | |
| 2005/0216322 A1 | 9/2005 | Weild, IV | |
| 2005/0216323 A1 | 9/2005 | Weild, IV | |
| 2005/0216359 A1 | 9/2005 | Welter et al. | |
| 2005/0228685 A1 | 10/2005 | Schuster et al. | |
| 2005/0256727 A1 | 11/2005 | Bennett et al. | |
| 2005/0261954 A1 | 11/2005 | Aoyama et al. | |
| 2005/0278052 A1 | 12/2005 | Bett et al. | |
| 2006/0020512 A1 | 1/2006 | Lucas et al. | |
| 2006/0036507 A1 | 2/2006 | Pujar et al. | |
| 2006/0069598 A1 | 3/2006 | Schweitzer et al. | |
| 2006/0112099 A1 | 5/2006 | Musgrove et al. | |
| 2006/0184457 A1 | 8/2006 | Sanderlin | |
| 2006/0282360 A1 | 12/2006 | Kahn et al. | |
| 2007/0050272 A1 | 3/2007 | Godlewski et al. | |
| 2008/0118051 A1 | 5/2008 | Odinak et al. | |
| 2008/0167936 A1 | 7/2008 | Kapoor | |
| 2012/0209734 A1 | 8/2012 | Brooks et al. | |

OTHER PUBLICATIONS

U.S. Appl. No. 60/374,892, filed Apr. 22, 2002, Krajec.

(56) References Cited

OTHER PUBLICATIONS

"Beyond Markdown Management", summer/autumn 03, the 4caster, Issue 4, vol. 2, 4 pages.
"Retailers Manage Markdown Challenges Using i2 Solutions", Jan. 13, 2003, NFR 92nd Annual Convention & Expo, 2 pages.
Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.
Melcher, "Local tech firm creates retail markdown tool", Mar. 24, 2000, Cincinnati Business Courier, 3 pages.
Profitlogic, available at http://webarchive.org/web/20020603 11838/, available at least by Apr. 15, 2005, 22 pages.
Subrahmanyan et al., "Developing optimal pricing and inventory policies for retailers who face uncertain demand", Journal of Retailing, vol. 72, No. 1, Spring, 1996, 15 pages.
Kelkar et al., Price Modeling in Standards for Electronic Product Catalogs Based on XML, 2002, pp. 366 A1375.
Srinivasan et al., Concepts and strategy guidelines for designing value enhancing sales promotions, Journal of Product and Brand Management, vol. 7, No. 5, 1998, pp. 410 A1420.
Abraham et al., "An Implemented System for Improving Promotion Productivity Using Store Scanner Data", Marketing Science, Summer 1993, vol. 12, No. 3, pp. 248-269.
Anon., "(A Lot of) Life After H. Ross: Electronic Data Systems", Financial World, vol. 162, No. 22, Nov. 9, 1993 (p. 50(2)).
Brown, "The Effects of Assortment Composition Flexibility on Operating Efficiency", (Abstract Only), Dissertation Abstracts Int'l, vol. 55/08-A, available at least by 1994, (p. 2458).
Jensen et al., "Long-Term Construction Contracts: The Impact of Tamra '88 on Revenue Recognition", Journal of Construction Education, Spring 1997, vol. 2, No. 1, pp. 37-53.
Srinivasan et al., Concepts and strategy guidelines for designing value enhancing sales promotions, Journal of Product and Brand Management, vol. 7, No. 5, 1998, pp. 410-420.
Wilson, "Changing the Process of Production", Industrial Management, vol. 37, No. 1, Jan./Feb. 1995 (pp. 1-2).
PIMA 2004 Leadership Conference Schedule of Events for Monday, Jun. 28, 2004, Winter/Spring 2004, The PIMA Post, 8 pages.
Fennell et al., A Integrated Approach-Market Definition, Market Segmentation, and Brand Positioning Create a Powerful Combination, Winter 2004, Market Research, pp. 29-34 (7 pgs. total).
Georgantis et al., A Review and Evaluation of Platforms and Tools for Building e-Catalogs, 2002, Proceedings of the 35th Hawaii International Conference of System Sciences, 2002 IEEE, 10 pages.
Kumar et al., Managing Supplier Relationships, Quality Progress, Sep. 2003, pp. 24-30, vol. 36, Iss. 9.
Office Action for U.S. Appl. No. 10/898,898, mail date Feb. 10, 2009, 16 pages.
Office Action for U.S. Appl. No. 10/898,898, mail date Jul. 24, 2008, 14 pages.
Office Action for U.S. Appl. No. 10/898,898, mail date Jun. 24, 2009, 48 pages.
Office Action for U.S. Appl. No. 10/898,898, mail date Oct. 15, 2007, 9 pages.
Office Action for U.S. Appl. No. 10/913,645, mail date Feb. 19, 2010, 19 pages.
Office Action for U.S. Appl. No. 10/913,645, mail date May 28, 2009, 15 pages.
Office Action for U.S. Appl. No. 10/913,645, mail date Nov. 2, 2009, 17 pages.
Office Action for U.S. Appl. No. 10/913,645, mail date Oct. 30, 2008, 11 pages.
Office Action for U.S. Appl. No. 11/048,124, mail date Apr. 29, 2009, 17 pages.
Office Action for U.S. Appl. No. 11/048,124, mail date Dec. 31, 2009, 17 pages.
Office Action for U.S. Appl. No. 11/074,369, mail date Aug. 1, 2008, 9 pages.
Office Action for U.S. Appl. No. 11/074,369, mail date Dec. 11, 2007, 7 pages.
Office Action for U.S. Appl. No. 11/220,449, mail date Sep. 21, 2009, 14 pages.
Poisson, John, Value Creation Through Tactical Pricing, Accenture, 2004, 12 pages, PIMA Conference, New Orleans, LA.
US Notice of Allowance on U.S. Appl. No. 10/898,898, mail date Feb. 2, 2010, 14 pages.
US Notice of Allowance on U.S. Appl. No. 11/220,449, mail date Jan. 12, 2010, 5 pages.
Office Action for U.S. Appl. No. 10/913,645, mail date Jul. 28, 2010, 21 pages.
Office Action for U.S. Appl. No. 11/048,124, mail date Jun. 7, 2010, 17 pages.
Office Action for U.S. Appl. No. 11/765,127, mail date Sep. 22, 2010, 12 pages.
"InfoNow Makes Channel Intelligence Available On Demand; Software-as-a-service reporting tool analyticInsight delivers increased visibility into channel sales performande; enables more infromed, strategic decision-making." PR Newswire May 30, 2007 Business Dateline, ProQuest Web. Oct. 15, 2011, 2 pages.
Notice of Allowance for U.S. Appl. No. 11/765,127, mail date Nov. 1, 2011, 10 pages.
Notice of Allowance for U.S. Appl. No. 12/785,301, mail date Jul. 26, 2011, 6 pages.
Office Action for U.S. Appl. No. 11/048,124, mail date Apr. 25, 2011, 20 pages.
Office Action for U.S. Appl. No. 12/785,301, mail date Apr. 18, 2011, 6 pages.
Office Action for U.S. Appl. No. 11/048,124, mail date Dec. 3, 2010, 19 pages.
Office Action for U.S. Appl. No. 11/765,127, mail date Jul. 27, 2010, 5 pages.
Office Action for U.S. Appl. No. 11/765,127, mail date Mar. 17, 2011, 11 pages.
Office Action on U.S. Appl. No. 11/048,124, mail date Sep. 27, 2012, 16 pages.
Non-Final Office Action on U.S. Appl. No. 11/048,124, mail date Jun. 13, 2013, 14 pages.
Notice of Allowance on U.S. Appl. No. 11/048,124, mail date Oct. 9, 2013, 9 pages.

\* cited by examiner

METHOD AND SYSTEM FOR CLASSIFYING RETAIL PRODUCTS AND SERVICES USING CHARACTERISTIC-BASED GROUPING STRUCTURES

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND

The present description relates generally to the field of classifying retail products and services, and more specifically to methods of and systems for classifying retail products and services using characteristic-based grouping structures.

Merchants typically classify retail products and services based on one or more attributes of the retail products and services. While all businesses must deal with product variations in some way, the issue is critical in the retail industry. In the retail industry, merchants may classify retail items based on many various color-specific, size-specific, or color-and-size-specific attributes of the items. For example, for color-specific attributes in the fashion retail industry, there may by many thousand different color values and variations (e.g., red, dark red, light red, magenta, pink, etc.) for fashion items. The complexity of organization for the many possible values of a particular attribute may overwhelm the capacity of conventional automated classification systems. Further, individual items or groups of items may require only a limited set from a spectrum of several thousand possible values of a particular attribute in the system, making it difficult to select and assign attributes to the individual item or group of items. There is an ongoing need for improved methods of and systems for classifying retail products and services. Thus, it would be beneficial to provide an automated method of and system for classifying retail products and services that allows users to consolidate the available values and variations of an attribute into manageable groupings by using characteristic-based grouping structures.

SUMMARY

According to an exemplary embodiment, a method of classifying retail products and services includes determining a grouping of characteristic values in a computerized system, wherein the grouping of characteristic values includes a subset of a plurality of predetermined values for a characteristic. The method also includes associating the grouping of characteristic values with a grouping of at least one of retail products and services.

According to another exemplary embodiment, a system for classifying retail products and services includes means for determining a grouping of characteristic values, wherein the grouping of characteristic values includes a subset of a plurality of predetermined values for a characteristic. The system also includes means for associating the grouping of characteristic values with a grouping of at least one of retail products and services.

According to another exemplary embodiment, a program product for classifying retail products and services includes machine-readable program code for causing, when executed, one or more machines to perform the steps of determining a grouping of characteristic values, wherein the grouping of characteristic values includes a subset of a plurality of predetermined values for a characteristic, and associating the grouping of characteristic values with a grouping of at least one of retail products and services.

According to another exemplary embodiment, a data structure for classifying retail products and services includes a plurality of predetermined values for a characteristic; and a plurality of characteristic value groupings, wherein each characteristic value grouping includes a subset of the plurality of predetermined values for the characteristic, and wherein the plurality of characteristic value groupings form hierarchical structure within the data structure.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION

In the following description, for the purposes of explanation, numerous details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments. Furthermore while the embodiments described herein refer primarily to retail products or retail sales articles, it is envisioned that the present description will be applicable to the sale of any type of good or service.

Figure 1:
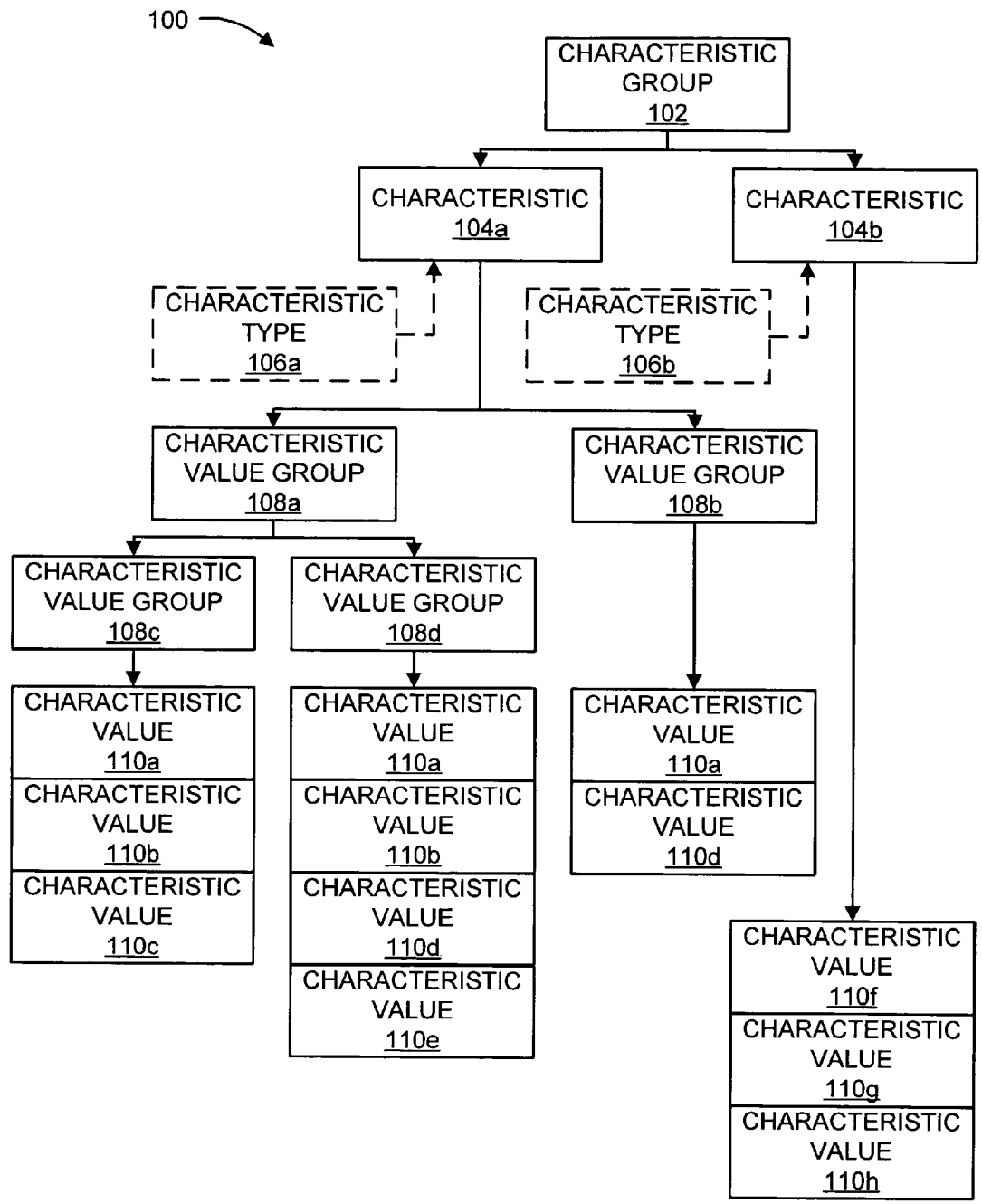
FIG. 1 is a block diagram illustrating a characteristic-based grouping structure for classifying retail products and services according to an exemplary embodiment.

FIG. 1 illustrates a characteristic-based grouping structure 100 for classifying retail products and services according to an exemplary embodiment. Structure 100 includes one or more characteristic groups 102, one or more characteristics 104, a characteristic type 106 associated with each characteristic, one or more characteristic value groups 108, and one or more characteristic values 110. For example, in the illustrated embodiment, data structure 100 includes characteristic group 102, characteristics 104a and 104b, characteristic types 106a and 106b associated with characteristics 104a and 104b respectively, characteristic value groups 108a-108d, and characteristic values 110a-110h. Structure 100 may generally be used to facilitate the classification of retail products and services. More specifically, structure 100 may be used to facilitate the assignment of one or more characteristic values 110 to a grouping of retail products and/or services according to one or more characteristic value groups 108.

Each characteristic group 102 includes one or characteristics 104. For example, in the illustrated embodiment, characteristic value group 102 includes characteristics 104a and 104b. Characteristic group 102 is used to group multiple characteristics 104 that describe a same or similar attribute one or more items in a grouping of retail products or services. For example, characteristic group 102 may represent a "sizes" grouping where characteristic 104a represents all shoe sizes and characteristic 104b represents all clothing sizes.

Each characteristic 104 represents an attribute that may be used to describe or differentiate one or more items in a grouping of retail products and/or services, such as differing lengths, colors, weights, etc. For example, in the illustrated embodiment, characteristic 104a may represent shoe sizes and characteristic 104b may represent clothing sizes. Characteristic 104 may be purely informative in nature, or may be used to facilitate the definition of one or more variants of an item.

According to an exemplary embodiment, each characteristic 104 is associated with a characteristic type 106. For example, in the illustrated embodiment, characteristic 104a is associated with characteristic type 106a and characteristic 104b is associated with characteristic type 106b. Characteristic types 106 may be used, for example, where the items that are classified by structure 100 are associated with other external processes that are dependent upon a number of general item characteristics. By way of example, retail fashion items may generally be described by color-related characteristics and size-related characteristics. In order to facilitate the implementation of one or more color-related or size-related external processes (e.g., the assignment of a markdown profile based on color or size in general), characteristic type 106a in the illustrated embodiment may be used for "color" and characteristic type 106b may be used for "size" in order to generally identify each characteristic 104 as either a color-related characteristic or a size-related characteristic. According to an exemplary embodiment, three characteristic types 106 are used to generally identify each characteristic 104: (a) color; (b) size 1; and (c) size 2. In this embodiment, the characteristic types 106 for size 1 and size 2 may be used to differentiate fashion items having two size dimensions such as a waist and length measurement for trousers.

Each characteristic 104 is associated with one or more characteristic values 110. For example, in the illustrated embodiment, characteristic 104a is associated with characteristic values 110a-110e and characteristic 104b is associated with characteristic values 110f-110h. Each characteristic 104 may be directly grouped with each characteristic value 110. For example, in the illustrated embodiment, characteristic 104b is directly associated with characteristic values 110f-110h. Each characteristic 104 may also be associated with one or more characteristic values 110 according to one or more characteristic value groups 108. For example, in the illustrated embodiment, characteristic 104a is associated with characteristic values 110a-110e according to characteristic value groups 108a-108d.

Each characteristic value group 108 may be associated with a single characteristic 104, and includes one or more characteristic values 110 for the associated characteristic 104. Each characteristic value group 108 may also be associated with one or more groupings of retail products and/or services, as will be described in greater detail below. Accordingly, each characteristic value group 108 may be used to associate one or more characteristic values 110 with a grouping or groupings of retail products and/or services with which the characteristic value group 108 is associated. For example, in the illustrated embodiment, characteristic value group 108a may be used to associate corresponding characteristic values 110a-110e with one or more groupings of retail products or services with which characteristic value group 108a is associated. Similarly, characteristic value group 108b may be used to associate characteristic values 110a and 110d with one or more groupings of retail products or services with which price level group 108b is associated.

Any number of characteristic value groups 108 may also be grouped hierarchically within a characteristic 104. For example, in the illustrated embodiment, characteristic value group 108a depends directly from characteristic 104a and includes characteristic value groups 108c and 108d which depend from it. In this example, characteristic 104a could represent "clothing colors," and characteristic value group 108a could represent a subset of clothing colors for the year "2004," while characteristic value groups 108c and 108d could represent seasonal subsets of clothing colors for the year 2004 corresponding to "spring/summer" and "fall/winter" respectively. Each characteristic value group 108 may include both single characteristic values 110 and other characteristic value groups 108 nested hierarchically within.

Each characteristic value 110 defines a value that the characteristic 104 with which it is associated may assume. For example, where characteristic 104a is a represents the characteristic "clothing color," characteristic values 110a-110c may represent the colors "red," "blue," "white," and "black." Individual characteristic values 110 may be used in several different characteristic value groups 108. For example, in the illustrated embodiment, characteristic value 110a is used in each of characteristic value groups 108a, 108b, 108c, and 108d.

Each characteristic value 110 conforms to a data format specified for the associated characteristic 104, such as a character format or a numeric format. Examples of character-type characteristic values 110 that may be used with an associated characteristic 104 for clothing sizes include "S," "M," "L," and "XL" for small, medium, large, and extra-large sizes respectively, or W32/L32, W32/L34 etc. for clothing items with waist and length size dimensions. Examples of character-type characteristic values 110 that may be used with an associated characteristic 104 for clothing color include "red," "blue," "white," "black," etc.

A color code may be used as a numeric-type technical description of the values of a characteristic 104 for "color." The color code may include, for example, a string of digits wherein each digit represents a subcomponent of the color description. According to an exemplary embodiment, a color code includes a number of digits representing a main color, a secondary color, and a pattern. For example, the first two digits of the color code may represent the color and shading of the main color, and the second two digits may represent the color and shading of the secondary color, and the last digit may represent the pattern. In this example, the color coding for the main an secondary colors could be selected as: (0) no color; (1) white; (2) beige; (3) yellow; (4) red; (5) green; (6) blue; (7) brown; (8) gray; and (9) black. The shading coding for the main an secondary colors could be selected as: (0) no shading; (1) light; (2) medium; (3) dark; and (4)-(9) special. The pattern coding could be selected as: (0) no pattern; (1) checkered; (2) striped; (3) other pattern; and (9) varicolored. Thus the code "62311" would represent a medium blue/light yellow checkered item. Using this exemplary coding scheme, special main and secondary colors could be coded as follows using the special shading values: (35) gold; (36) orange; (45) pink; (55) khaki; (65) violet; (85) silver. Special coding cases could include "00000" for an item with no color; "10000" for a solid white article, and "00009" for a varicolored article with no main color.

As described above, each characteristic value group 108 may be associated with a grouping of retail products and/or services. The grouping of retail products and/or services may be, for example, a node within a merchandise hierarchy. Associating a characteristic value group 108 with a grouping of retail products and/or services in turn associates the characteristic values 110 included in the characteristic value group 108 with that grouping of retail products and/or services. According to an exemplary embodiment, directly assigning a characteristic value group 108 to one or more groupings of retail products and/or services limits the applicability of the characteristic value group 108 to those particular groupings, while unassigned characteristic value groups 108 are associated with all groupings of retail products and/or services.

Associating a characteristic value group 108 with a grouping of retail products and/or services facilitates the use of a limited subset of desired characteristic values 110 from a large number of available characteristic values 110 for a characteristic 104 to define the attributes of the individual items or groupings of items. For example, while navigating through a hierarchy of characteristic value groups 108, an entire characteristic value group 108 may be selected in addition to individual characteristic values 110, such that a large, yet more limited and manageable number of characteristic values 110 may be selected at once to define the maximum scope of variants of an item or grouping of items. The use characteristic value groups also facilitates the definition of logical or other desired subsets of characteristic values, such as seasonal groupings of characteristic values for color. In this way, the use of characteristic value groups may reduce the effort required to select and assign the relevant characteristic values for a grouping of retail products and services.

Figure 2:
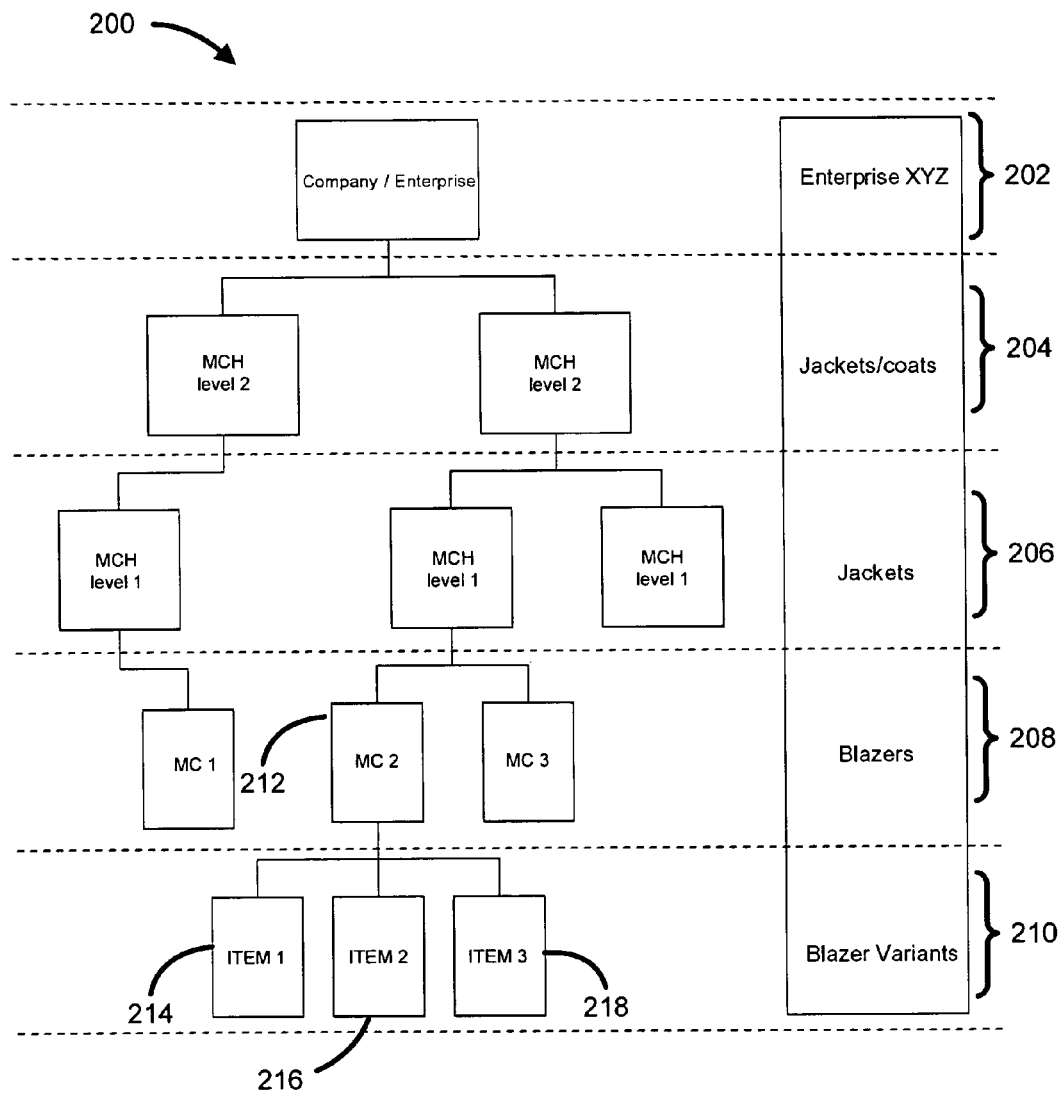
FIG. 2 is a block diagram illustrating a merchandise hierarchy according to an exemplary embodiment.

FIG. 2 illustrates a merchandise hierarchy 200 that may be used to group retail products or services according to an exemplary embodiment. Merchandise hierarchy 200 represents a long-term retail product or service grouping structure that is independent of a store structure or layout. Retail products or services are grouped in merchandise hierarchy 200 based on one or more item characteristics, and each node in merchandise hierarchy 200 represents a grouping of retail products or services.

In the illustrated embodiment, a merchandise (MC) level 208 represents the lowest level in merchandise hierarchy 200. This means that different items that are assigned to the same MC node have at least the same characteristic(s) assigned to the MC node. For example, items 214, 216 and 218 (comprising three blazers having different styles, sizes and/or colors) in a level 210 are assigned to a single MC node 212 and thus have at least the same characteristic(s) (e.g., they are all blazers) represented by MC node 212. According to an exemplary embodiment, each item is assigned to exactly one MC node in merchandise hierarchy 200, and multiple MC nodes can be grouped together to form merchandise hierarchy (MCH) levels. For example, merchandise hierarchy 200 is illustrated with a MCH level 206 (comprising a "jackets" category) immediately above MC level 208, and a higher MCH level 204 (comprising a "jackets/coats" category) above MCH level 206. The topmost layer in merchandise hierarchy 200 is an enterprise level 202. The nodes in the lowermost level in merchandise hierarchy 200 and in similar merchandise hierarchies may be referred to as merchandise categories. Thus, categories may represent differentiated, independently controllable groups of retail products and/or services that consumers recognize as different and/or exchangeable to satisfy a need.

A merchandise hierarchy may be formed for various reasons. For example, it may be formed to: (i) plan a grouping of retail products or services, (ii) enable structured analyses in the information system and the planning of target and actual values at the MC level, and (iii) save common data (such as conditions) at superior levels to reduce storage space. According to an exemplary embodiment, the following information may be defined for each MC node: price, color, and size groups; validity periods; n characteristics, and status values. In this embodiment, colors may be saved hierarchically as main colors or single colors. The main colors can have various characteristic values, which represent the single colors. In this case, the single colors are variant-creating characteristics. Accordingly, a merchandise hierarchy having this structure would allow for analysis of main colors, single colors, and attribute values.

One or more characteristics 104 or characteristic value groups 108 may be assigned to each node in level 208 of merchandise hierarchy 200. The characteristics 104 or characteristic value groups 108 assigned to each node in level 208 of merchandise hierarchy 200 may be used for classification of the items assigned to each node in level 208. As described above, each characteristic 104 represents a defined property of an item, such as the color of a blouse. Each characteristic 104 or characteristic value group 108 helps to differentiate items in merchandise hierarchy 200 from one another and to find specific items in the information system (e.g., list all items with a characteristic value "Red" of a "Color" characteristic). Each characteristic 104 may be either variant-creating (i.e., used in the definitions of the item variants) or purely informative. According to an exemplary embodiment, two or three-dimensional variant-creating characteristics 104 can be defined for each MC node. According to another exemplary embodiment, once a characteristic 104 is assigned to a node in level 208, the items in that node inherit all attributes defined by that characteristic.

According to another embodiment, below the MC level, and thus below the entire merchandise hierarchy, characteristic profiles may be defined to segment or specialize the merchandise hierarchy. This may be done to simplify the creation of new generic items, variants, and single items.

In this embodiment, a characteristic profile may be used to define different combinations of characteristics 104 and their associated characteristic values 110, such as a characteristic profile for sizes only, a characteristic profile for colors only, a characteristic profile for sizes and colors, etc. For example, a characteristic profile called "ladies' sizes" could be defined to include a characteristic 104 for "clothing sizes" and the corresponding characteristic values 110 for the sizes 34 to 48. Multiple characteristic profiles can be created for multiple nodes in level 210 of merchandise hierarchy 200. A characteristic profile can be assigned several times within the merchandise hierarchy. Thus, every item that is assigned to a node in level 210 of merchandise hierarchy 200 can optionally be assigned to a characteristic profile. According to an exemplary embodiment, the relationship between characteristic profiles and nodes in level 210 of merchandise hierarchy 200 is n:m. That is, a single characteristic profile can be linked to multiple nodes in level 210 of merchandise hierarchy 200, and multiple characteristic profiles may be linked to a single node in level 210 of merchandise hierarchy 200. According to another exemplary embodiment, a characteristic profile may be used to associate a characteristic value group 108 with one or more groupings of retail products or services based on the particular characteristics 104 that are defined for that particular characteristic profile.

As persons skilled in the art will appreciate, the use of characteristic profiles provides several advantages. For example, characteristic profiles can be used to (i) group sets of colors and sizes, (ii) assign them to the relevant nodes in level 210 of merchandise hierarchy 200, and (iii) select the suitable profile when creating items.

Figure 3:
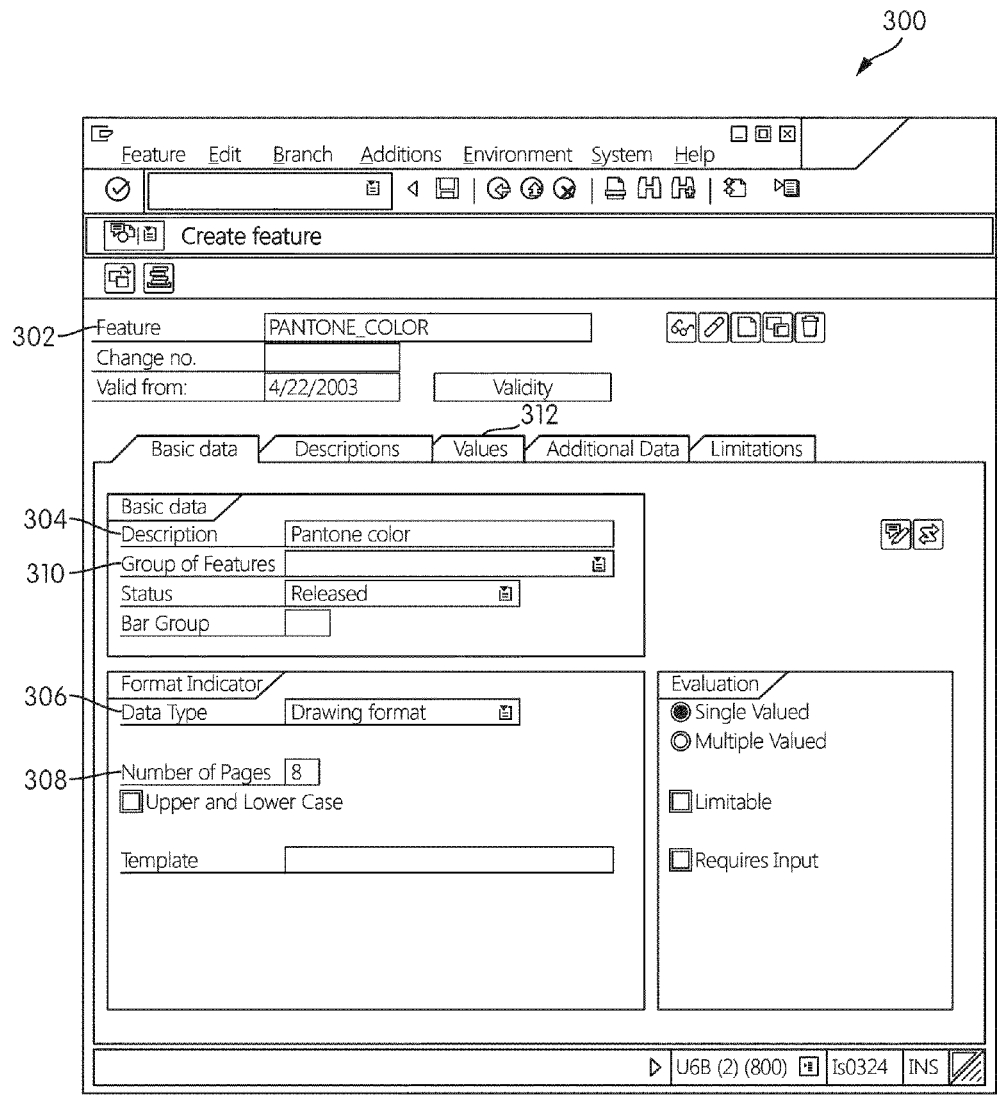
FIG. 3 illustrates a graphical user interface screen configured to facilitate the definition of a characteristic according to an exemplary embodiment.

FIG. 3 illustrates a graphical user interface screen 300 configured to facilitate the definition of a characteristic 104 according to an exemplary embodiment. Screen 300 includes a field 302 in which a name for the characteristic 104 may be entered, and a field 304 in which a language-specific description for the characteristic 104 may be entered. Screen 300 also includes a field 306 in which the data format of the characteristic values 110 is entered (e.g., character, numeric, etc.). Preferably, the data format is selected such that the technical description of the characteristic value 110 is as close to the real data format as possible (e.g. use of the format character for clothing sizes such as W32/L32). Screen 300 also includes a field 308 in which the maximum number of places that the characteristic value 110 may have is entered. For example, if a Pantone number is used for a characteristic 104 for color, the number of places may be set to 8 in field 308. Screen 300 also includes a field 310 in which a characteristic group 102 may be designated for a characteristic 104, such that it may be grouped together with other characteristics that describe similar attributes as described above. Screen 300 also includes an area 312, shown in the illustrated embodiment as a tab labeled "Values." Selecting area 312 calls a screen which enables one or more characteristic values 110 to be defined for a characteristic 104.

Figure 4:
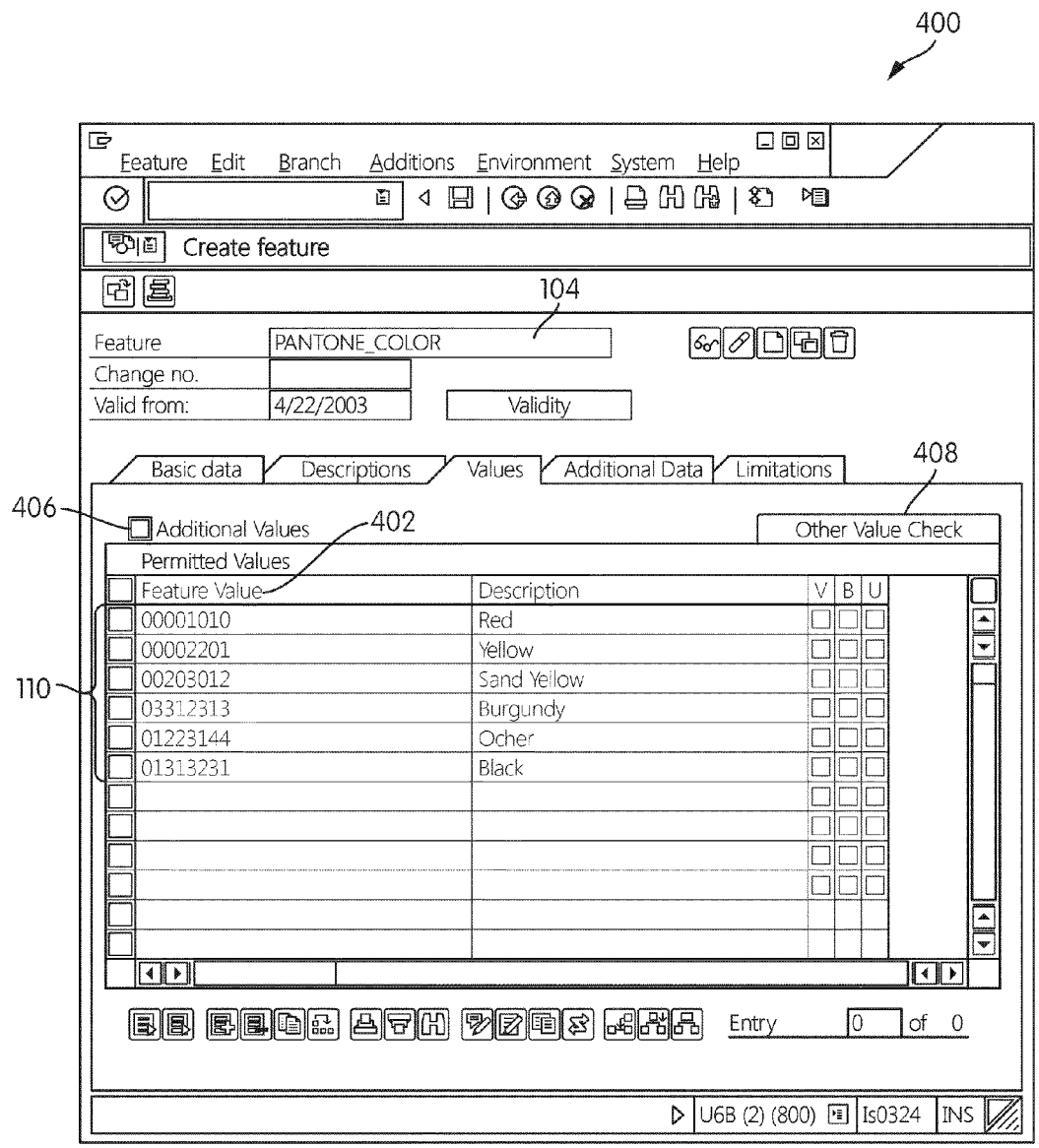
FIG. 4 illustrates a graphical user interface screen configured to facilitate the definition of one or more characteristic values for a characteristic according to an exemplary embodiment.

FIG. 4. illustrates a graphical user interface screen 400 configured to facilitate the definition of one or more characteristic values 110 for a characteristic 104 according to an exemplary embodiment. Screen 400 includes an area 402 comprising a number of rows in which a characteristic value 110 may be entered for characteristic 104. If characteristic 104 has a character format as defined in screen 300, a language-specific name can be entered in addition to the characteristic value 110 in an area 404. Users may freely define their own characteristics 104 and characteristic values 110 based on any desired coding system.

Screen 400 also includes an "Additional Values" button or icon 406. If button or icon 406 is selected, additional characteristic values 110 may be added at a later time when items are added to an associated grouping of retail products and/or services. The values entered at a later time are available only for particular items, and are not automatically added to characteristic 104. The additional characteristic values may be freely defined and are not cross-checked with an existing list of defined characteristic values.

Figure 5:
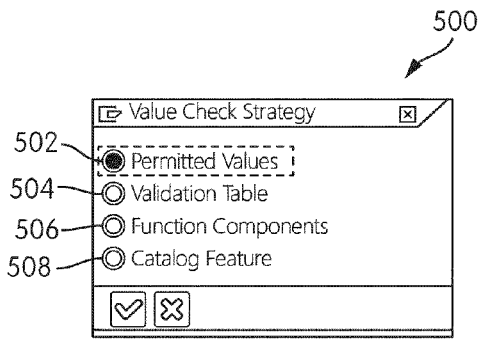
FIG. 5 illustrates a screen configured to facilitate the definition of how the characteristic values defined in screen of FIG. 4 are stored and accessed according to an exemplary embodiment.

Screen 400 also includes a button or icon 408, labeled "Other Value Check" in the illustrated embodiment. When button or icon 408 is selected, a screen is called which may be used to define how the characteristic values 110 defined in screen 400 are stored and accessed. FIG. 5 illustrates a screen 500 configured to facilitate the definition of how the characteristic values 110 defined in screen 400 are stored and accessed according to an exemplary embodiment. In the illustrated embodiment, screen 500 is labeled "Strategy for Value Check." Screen 500 includes selection options 502, 504, 506, and 508. If option 502, labeled "Allowed Values" in the illustrated embodiment, is selected the characteristic values defined in screen 400 are stored directly with characteristic 104, and additional characteristic values 110 may be added at a later time as described above with regard to button or icon 406. If option 504, labeled "Check Table" in the illustrated embodiment, is selected, all characteristic values 110 are stored in a check table, and it is not possible to add additional characteristic values at a later time that are not already stored in the check table. If option 506, labeled "Function Module" in the illustrated embodiment, is selected, the characteristic values 110 are stored in a table to which access may be controlled using access modules or check modules that integrate additional selection logic, presentation logic, or other application logic. If option 506 is selected, it is not possible to add additional characteristic values at a later time that are not already stored in the table.

Figure 6:
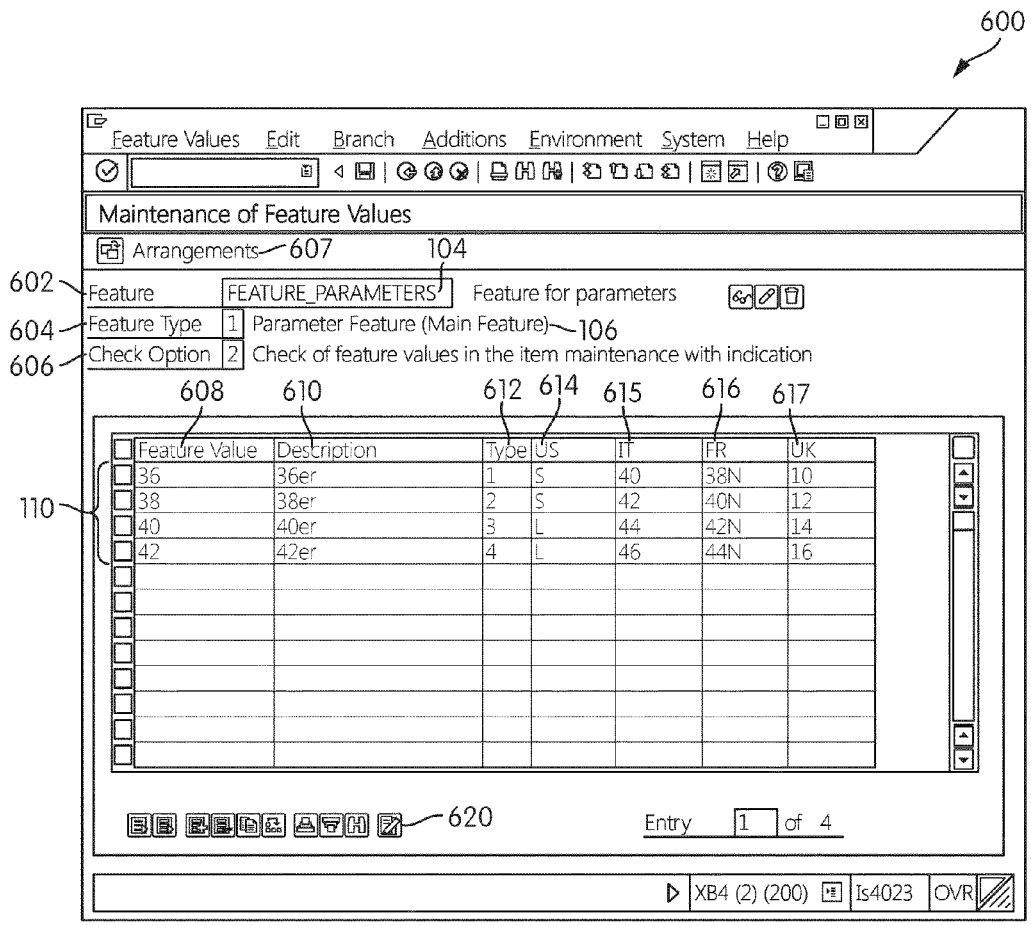
FIG. 6 illustrates a graphical user interface screen configured to facilitate the implementation of one or more characteristic value groups for a size-type characteristic according to an exemplary embodiment.

FIG. 6 illustrates a graphical user interface screen 600 configured to facilitate the implementation of one or more characteristic value groups 108 for a characteristic 104 of a characteristic type 106 for size according to an exemplary embodiment. Screen 600 includes an area 602 for the name or other identifier of the characteristic 104, and a field 604 for the characteristic type 106 of the characteristic 104. Screen 600 also includes an area 606 for the type of check to be used for the associated characteristic values (e.g., whether or not additional characteristic values may be added later when associated items are added or modified). Screen 600 further includes a button or icon 607. Selecting button or icon 607 calls a screen which is configured to implement the assignment of one or more characteristic value groups 108.

Screen 600 also includes an area or column 608 for the associated characteristic values 110 and an area or column 610 for the language-specific description for each characteristic value 110. Screen 600 further includes an area or column 612 to indicate the sort position for each characteristic value. The sort position may be used to control the display sequence of characteristic values 110 where, for example, alphabetic sorting differs from the desired sorting scheme, such as the sorting of sizes "XS," "S," "M," "L," and "XL," etc.

Figure 10:
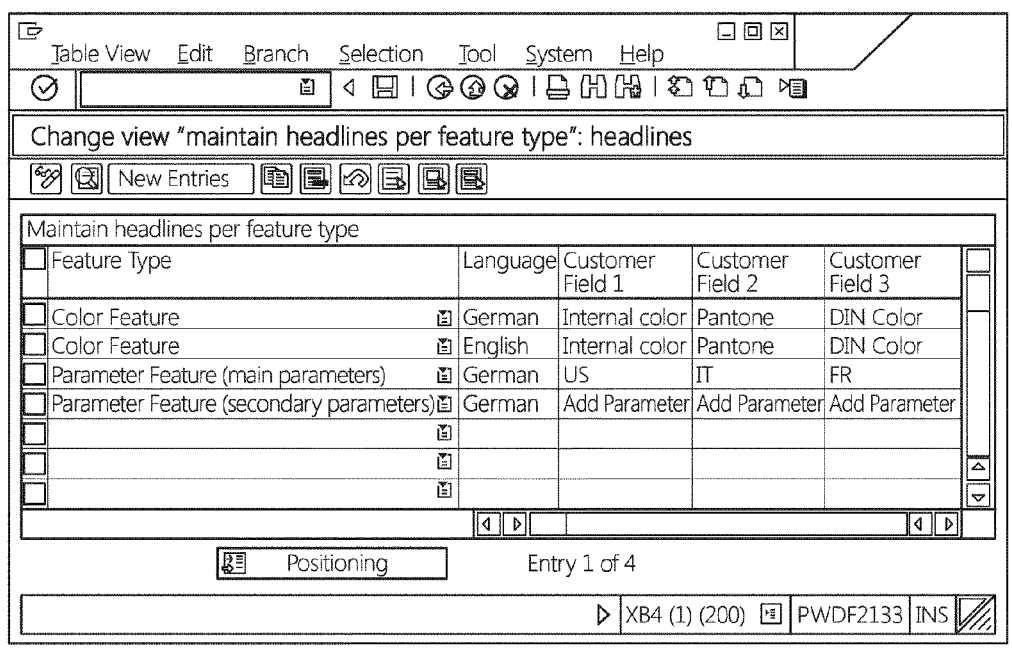
FIG. 10 illustrates an exemplary graphical user interface screen for defining a customized header for the additional areas or columns for each characteristic type.

Screen 600 may also include a number of additional areas or columns which may be used, for example, to specify additional coding or transformation schemes for the defined characteristic values 110. For example, in the illustrated embodiment, four additional areas or columns 614, 615, 616, and 617 are included to save corresponding sizes for the United States, Italy, France, and the United Kingdom respectively. According to another exemplary embodiment, up to ten additional areas or columns are provided based in the characteristic type in area 604 of screen 600. In this embodiment, a user may define a customized header for each of the ten additional areas or columns for each characteristic type. FIG. 10 illustrates an exemplary graphical user interface screen for defining a customized header for the additional areas or columns for each characteristic type.

Figure 7:
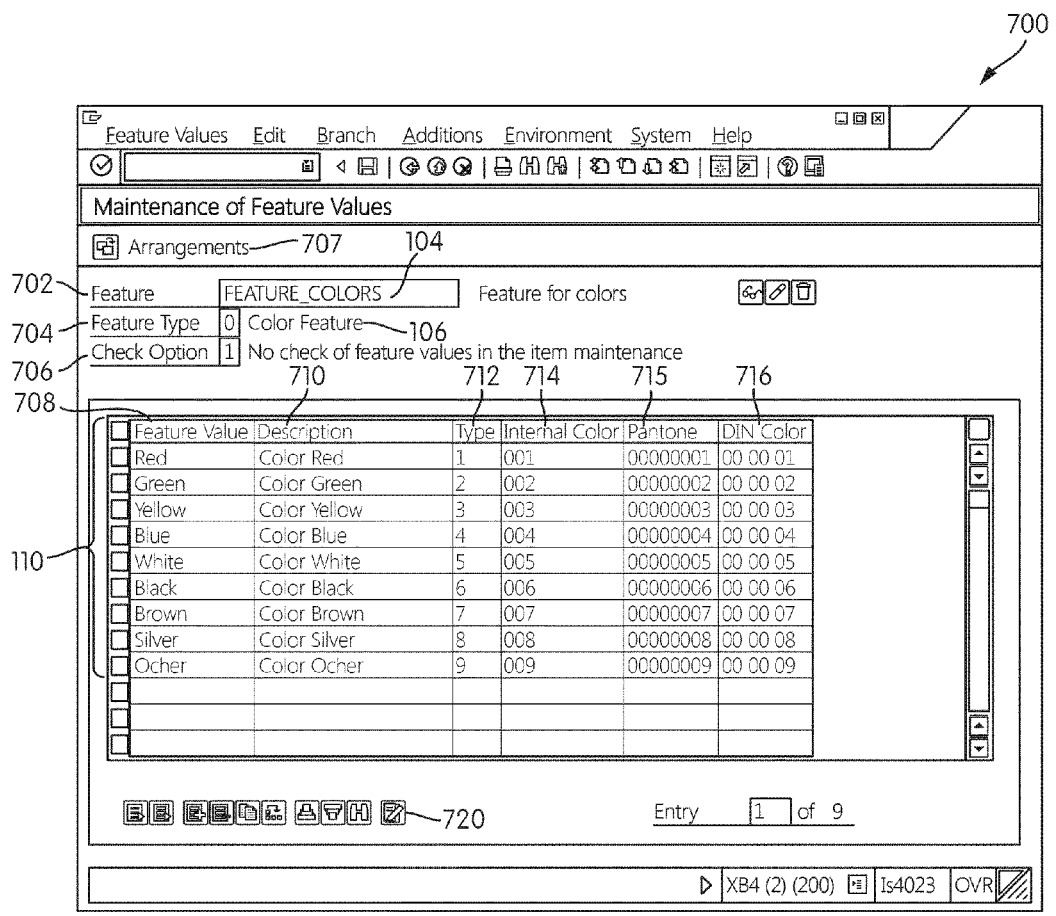
FIG. 7 illustrates a graphical user interface screen configured to facilitate the implementation of one or more characteristic value groups for a color-type characteristic according to an exemplary embodiment.

FIG. 7 illustrates a graphical user interface screen 700 configured to facilitate the implementation of one or more characteristic value groups 108 for a characteristic 104 of the color type according to an exemplary embodiment. Similar to screen 600, screen 700 includes an area 702 for the name or other identifier of the characteristic 104, and a field 704 for the characteristic type 106 of the characteristic 104. Screen 700 also includes an area 706 for the type of check to be used for the associated characteristic values (e.g., whether or not additional characteristic values may be added later when associated items are added or modified). Screen 700 further includes a button or icon 707. Selecting button or icon 707 calls a screen which is configured to implement the assignment of one or more characteristic value groups 108.

Screen 700 also includes an area or column 708 for the associated characteristic values 110 and an area or column 710 for the language-specific description for each characteristic value 110. Screen 700 further includes an area or column 712 to indicate the sort position for each characteristic value.

Screen 700 may also include a number of additional areas or columns which may be used, for example, to specify additional coding or transformation schemes for the defined characteristic values 110. For example, in the illustrated embodiment, four additional areas or columns 714, 715, and 716 are included to save corresponding color coding schemes. According to another exemplary embodiment, up to ten additional areas or columns are provided based in the characteristic type in area 704 of screen 700. In this embodiment, a user may define a customized header for each of the ten additional areas or columns for each characteristic type (e.g., using the exemplary graphical user interface screen shown in FIG. 10).

Figure 8:
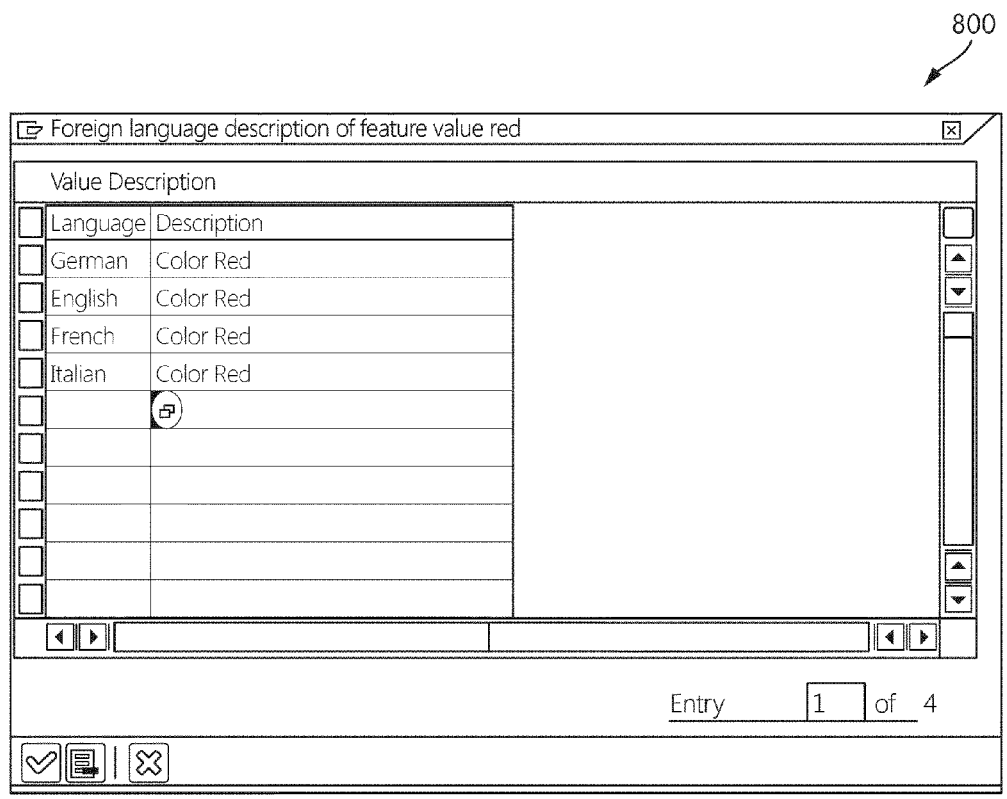
FIG. 8 illustrates a graphical user interface screen configured to facilitate the implementation of foreign language names for characteristic values according to an exemplary embodiment.

FIG. 8 illustrates a graphical user interface screen 800 configured to facilitate the implementation of foreign language names for characteristic values 110 according to an exemplary embodiment. Screen 800 may be called, for example, by selecting a button or icon 620 in screen 600 (shown in FIG. 6) or by selecting a button or icon 720 in screen 700 (shown in FIG. 7).

Figure 9:
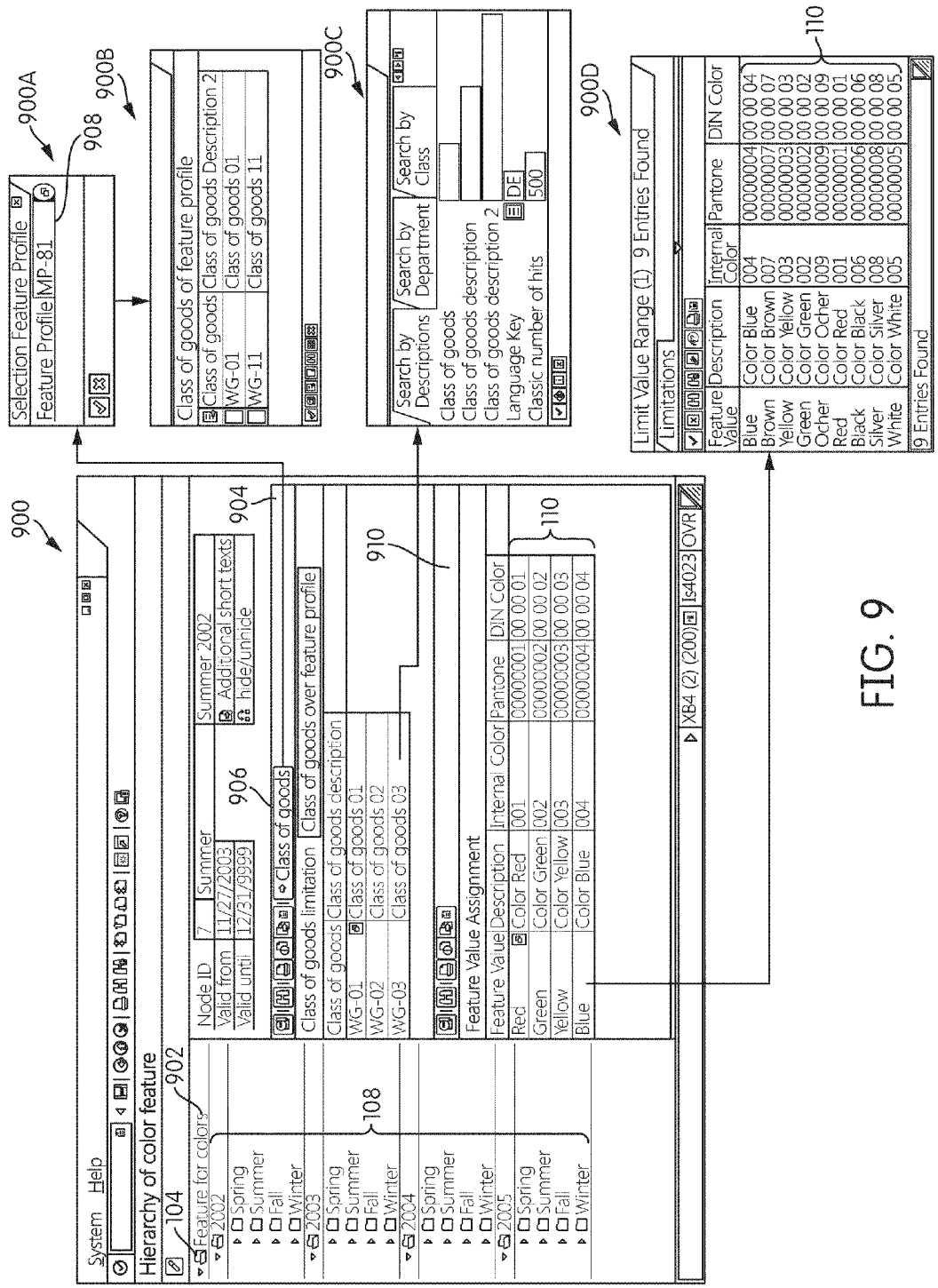
FIG. 9 illustrates a graphical user interface screen configured to implement the assignment of one or more characteristic value groups according to an exemplary embodiment.

FIG. 9 illustrates a graphical user interface screen 900 configured to implement the assignment of one or more characteristic value groups 108 according to an exemplary embodiment. Screen 900 includes an area 902 in which characteristic value groups 108 associated with a particular characteristic 104 (e.g., the characteristic selected in either screen 600 or screen 700) are displayed. In the illustrated embodiment, characteristic value groups 108 associated with characteristic 104 are displayed in a hierarchical "tree structure." For example, characteristic 104 is shown as having four characteristic value groups 108 depending from it and corresponding to the years "2002," "2003," "2004," and "2005." In turn, each of these characteristic value groups 108 has four characteristic value groups 108 depending from it and corresponding to the seasons "Spring," "Summer," "Fall," and "Winter." Each of these characteristic value groups 108 may be selected from the hierarchical structure in area 902 for either assignment to one or more groupings of retail products and/or services (e.g., a node in merchandise hierarchy 200) or for assignment of one or more characteristic values 110 defined for characteristic 104.

Screen 900 also includes an area 904 configured to facilitate the assignment of a characteristic value group 108 selected in area 902 to one or more nodes in a merchandise hierarchy, such as merchandise hierarchy 200. Area 904 includes a button or icon 906. Selecting button or icon 906 calls a screen 900A which includes a field 908 in which a characteristic profile may be entered. Once a characteristic profile is entered, a screen 900B displays a list of nodes in the merchandise hierarchy (e.g., nodes in level 210 of merchandise hierarchy 200) which are associated with the characteristic profile selected in screen 900A. One or more of the nodes in screen 900B may then be selected and transferred to area 904 such that the characteristic value group 108 selected in area 902 is assigned to each of these nodes. Alternatively, a screen 900C may be called in order to identify individual nodes in a merchandise hierarchy (e.g., nodes in level 210 of merchandise hierarchy 200) such that the characteristic value group 108 selected in area 902 may be assigned to each of the identified nodes.

Screen 900 also includes an area 910 configured to facilitate the assignment of one or more characteristic values 110 defined for characteristic 104 to the characteristic value group 108 selected in area 902. A list of characteristic values 110 defined for characteristic 104 may be displayed by calling a screen 900D. Characteristic values 110 from screen 900D may then be individually transferred to area 910 such that they are assigned to the characteristic value group 108 selected in area 902.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

In some instances, the embodiments disclosed herein may be implemented by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. Non-transitory machine-readable storage media for classifying retail products and services using an automated process, the machine-readable storage media comprising program code stored therein executable by one or more machines to perform the automated process, the automated process comprising:

determining a plurality of groupings of characteristic values relating to a plurality of characteristics of a product in a computerized system, wherein each grouping of characteristic values includes a subset of a plurality of predetermined values for a particular one of the plurality of characteristics;

grouping hierarchically the plurality of groupings of characteristic values for each characteristic;

determining a plurality of characteristic profiles, each of the plurality of characteristic profiles being associated with at least one characteristic and a set of one or more groupings of characteristic values relating to the at least one characteristic, wherein the plurality of characteristic profiles include a first characteristic profile that is associated with a first characteristic and a second characteristic, wherein the first characteristic profile is further associated with a first set of groupings of characteristic values relating to the first characteristic and a second set of groupings of characteristic values relating to the second characteristic, wherein each of the first set and the second set of groupings of characteristic values comprises one or more of the determined plurality of groupings of characteristic values;

determining a merchandise hierarchy, the merchandise hierarchy including an enterprise level, one or more merchandise hierarchy levels, one or more merchandise categories;

assigning one or more products to each merchandise category in the merchandise hierarchy;

assigning one or more characteristic profiles to a plurality of products;

permitting the assignment of different characteristic profiles to multiple products associated with the same merchandise category;

for each product having an assigned characteristic profile, assigning characteristic values to the product based on the characteristic values of the assigned characteristic profile;

providing a user interface configured to enable a user to select a characteristic profile;

receiving a selection of the characteristic profile from the user;

receiving a modification of one or more characteristic values of the characteristic profile from the user; and modifying one or more corresponding characteristic values of the products associated with the selected characteristic profile based on the modification to the one or more characteristic values of the characteristic profile received from the user.

2. The non-transitory machine-readable storage media of claim 1, wherein at least one of the characteristics is a color associated with a retail product.

3. The non-transitory machine-readable storage media of claim 1, wherein at least one of the groupings of characteristic values is based on a seasonal grouping of colors associated with a merchandise category.

4. The non-transitory machine-readable storage media of claim 1, wherein the plurality of groupings of characteristic values is determined in response to user input from a graphical user interface.

5. The non-transitory machine-readable storage media of claim 1, wherein at least one of the groupings of characteristic values is configured to be associated with multiple merchandise categories.

6. The non-transitory machine-readable storage media of claim 1, wherein at least two of the groupings of characteristic values include at least one common value for the characteristic.

7. The non-transitory machine-readable storage media of claim 6, wherein the at least two of the groupings of characteristic values are configured to be assigned to the same merchandise category.

8. The non-transitory machine-readable storage media of claim 1, wherein each grouping of characteristic values is associated with the merchandise category in response to user input from a graphical user interface.

9. A system for classifying retail products and services, the system comprising:
   means for determining a plurality of groupings of characteristic values relating to a plurality of characteristics of a product in a computerized system, wherein each grouping of characteristic values includes a subset of a plurality of predetermined values for a particular one of the plurality of characteristics;
   means for grouping hierarchically the plurality of groupings of characteristic values for each characteristic;
   means for determining a plurality of characteristic profiles, each of the plurality of characteristic profiles being associated with at least one characteristic and a set of one or more groupings of characteristic values relating to the at least one characteristic, wherein the plurality of characteristic profiles include a first characteristic profile that is associated with a first characteristic and a second characteristic, wherein the first characteristic profile is further associated with a first set of groupings of characteristic values relating to the first characteristic and a second set of groupings of characteristic values relating to the second characteristic, wherein each of the first set and the second set of groupings of characteristic values comprises one or more of the determined plurality of groupings of characteristic values;
   means for determining a merchandise hierarchy, the merchandise hierarchy including an enterprise level, one or more merchandise hierarchy levels, and one or more merchandise categories;
   means for assigning one or more products to each merchandise category in the merchandise hierarchy;
   means for assigning one or more characteristic profiles to a plurality of products;
   means for permitting the assignment of different characteristic profiles to multiple products associated with the same merchandise category;
   means for assigning, for each product having an assigned characteristic profile, characteristic values to the product based on the characteristic values of the assigned characteristic profile;
   means for providing a user interface configured to enable a user to select a characteristic profile;
   means for receiving a selection of a characteristic profile from the user;
   means for receiving a modification of one or more characteristic values of the characteristic profile from the user; and
   means for modifying one or more corresponding characteristic values of the products associated with the selected characteristic profile based on the modification to the one or more characteristic values of the characteristic profile received from the user.

10. The system of claim 9, wherein at least one of the characteristics is a color associated with a retail product.

11. The system of claim 9, wherein at least one of the groupings of characteristic values is based on a seasonal grouping of colors associated with a merchandise category.

12. The system of claim 9, wherein the means for determining the plurality of groupings of characteristic values is configured to determine the plurality of groupings of characteristic values in response to user input from a graphical user interface.

13. The system of claim 9, wherein at least one of the groupings of characteristic values is configured to be associated with multiple merchandise categories.

14. The system of claim 9, wherein at least two of the groupings of characteristic values include at least one common value for the characteristic.

15. The system of claim 14, wherein the at least two of the groupings of characteristic values are configured to be assigned to the same merchandise category.

16. The system of claim 9, wherein the means for associating each grouping of characteristic values with the merchandise category is configured to associate each grouping of characteristic values with the merchandise category in response to user input from a graphical user interface.

17. A program product for classifying retail products and services, the program product comprising one or more non-transitory machine-readable storage media having machine-readable program code stored thereon for causing, when executed, one or more machines to perform the following method steps:
   determining a plurality of groupings of characteristic values relating to a plurality of characteristics of a product in a computerized system, wherein each grouping of characteristic values includes a subset of a plurality of predetermined values for a particular one of the plurality of characteristics;
   grouping hierarchically the plurality of groupings of characteristic values for each characteristic;
   determining a plurality of characteristic profiles, each of the plurality of characteristic profiles being associated with at least one characteristic and a set of one or more groupings of characteristic values relating to the at least one characteristic, wherein the plurality of characteristic profiles include a first characteristic profile that is associated with a first characteristic and a second characteristic, wherein the first characteristic profile is further associated with a first set of groupings of characteristic values relating to the first characteristic and a second set of groupings of characteristic values relating to the second characteristic, wherein each of the first set and the second set of groupings of characteristic values comprises one or more of the determined plurality of groupings of characteristic values;
   determining a merchandise hierarchy, the merchandise hierarchy including an enterprise level, one or more merchandise hierarchy levels, and one or more merchandise categories;
   assigning one or more products to each merchandise category in the merchandise hierarchy;
   assigning one or more characteristic profiles to a plurality of products;
   permitting the assignment of different characteristic profiles to multiple products associated with the same merchandise category;
   for each product having an assigned characteristic profile, assigning characteristic values to the product based on the characteristic values of the assigned characteristic profile;

providing a user interface configured to enable a user to select a characteristic profile;

receiving a selection of a characteristic profile from the user;

receiving a modification of one or more characteristic values of the characteristic profile from the user; and modifying one or more corresponding characteristic values of the products associated with the selected characteristic profile based on the modification to the one or more characteristic values of the characteristic profile received from the user.

18. The program product of claim 17, wherein at least one of the characteristics is a color associated with a retail product.

19. The program product of claim 17, wherein at least one of the groupings of characteristic values is based on a grouping of seasonal colors associated with a merchandise category.

20. The program product of claim 17, wherein the plurality of groupings of characteristic values is determined in response to user input from a graphical user interface.

21. The program product of claim 17, wherein at least one of the groupings of characteristic values is configured to be associated with multiple merchandise categories.

22. The program product of claim 17, wherein at least two of the groupings of characteristic values include at least one common value for the characteristic.

23. The program product of claim 22, wherein the at least two of the groupings of characteristic values are configured to be assigned to the same merchandise category.

24. The program product of claim 17, wherein each grouping of characteristic values is associated with the merchandise category in response to user input from a graphical user interface.

25. The non-transitory machine-readable media of claim 1, wherein at least one of the characteristics is a size associated with a retail product.

26. The system of claim 9, wherein at least one of the characteristics is a size associated with a retail product.

27. The program product of claim 17, wherein at least one of the characteristics is a size associated with a retail product.

* * * * *